US006491773B1

United States Patent
Miller et al.

(10) Patent No.: US 6,491,773 B1
(45) Date of Patent: *Dec. 10, 2002

(54) POSITION-CONTROLLED TENSIONER SYSTEM

(75) Inventors: Lloyd G. Miller; Keith G. Shupe, both of Bountiful, UT (US)

(73) Assignee: Alliant Techsystems Inc., Edina, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,357

(22) Filed: Jan. 24, 2000

(51) Int. Cl.$^7$ .............................................. B32B 31/00
(52) U.S. Cl. .................... 156/64; 156/229; 156/351; 156/368; 156/494
(58) Field of Search .................... 156/64, 160, 161, 156/162, 166, 169, 229, 350, 351, 367, 368, 378, 433, 494

(56) References Cited

U.S. PATENT DOCUMENTS

| | | | |
|---|---|---|---|
| 4,799,981 A | 1/1989 | Stone et al. .................... 156/64 |
| 4,867,834 A | 9/1989 | Alenskis et al. .............. 156/433 |
| 4,872,619 A | 10/1989 | Vaniglia .................... 242/7.21 |
| 4,877,193 A | 10/1989 | Vaniglia .................... 242/7.21 |
| 4,907,754 A | 3/1990 | Vaniglia .................... 242/7.21 |
| 4,943,338 A | 7/1990 | Wisbey ....................... 156/433 |
| 5,022,952 A | 6/1991 | Vaniglia ....................... 156/441 |
| 5,032,211 A | * 7/1991 | Shinno et al. ............... 156/361 |
| 5,045,147 A | 9/1991 | Benson et al. ............... 156/429 |
| 5,072,359 A | * 12/1991 | Kneifel, II ............. 364/167.01 |
| 5,110,395 A | 5/1992 | Vaniglia ....................... 156/353 |
| 5,223,072 A | 6/1993 | Brockman et al. .......... 156/361 |
| 5,266,139 A | 11/1993 | Yokota et al. ............... 156/169 |
| 5,273,602 A | 12/1993 | Gill et al. .................... 156/166 |
| 5,277,373 A | 1/1994 | Morton ......................... 242/45 |
| 5,290,389 A | 3/1994 | Shupe et al. ................. 156/425 |
| 5,698,066 A | 12/1997 | Johnson et al. ............. 156/441 |
| 5,779,830 A | * 7/1998 | Wakefield et al. ............ 156/64 |

FOREIGN PATENT DOCUMENTS

DE 39 20 855 A1 1/1991

OTHER PUBLICATIONS

European Search Report dated Jun. 24, 2002.
Gaberman et al., "Air Cylinder Allows Ultrafine Tension Control", pp. 90, 92 and 94, *PCIM*, Aug. 1997.

* cited by examiner

*Primary Examiner*—James Sells
(74) *Attorney, Agent, or Firm*—TraskBritt

(57) ABSTRACT

Apparatus and method for controlling tension of one or more fiber tows preferably including a support frame having a spool holder, a motor for driving the spool holder, a dancer arm having a free end with a redirect roller mounted thereon and a fixed end pivotally mounted to coact with an angular-position sensor, a low-friction pneumatic cylinder mounted to the dancer arm and a support plate to exert a force thereon, a second redirect roller mounted to coact with a second angular-position sensor, and a controller and associated circuitry to control the tension of the fiber by controlling the motor in response to the position of the dancer arm.

Preferably, a microcontroller mounted on a single printed circuit board (PCB) having signal buffering circuitry to control a plurality of individual tensioners is provided. The PCB preferably plugs into a backplane which allows communication between several microcontrollers, thereby allowing the control of at least 32 individual tensioners. Communication between a fiber placement machine main, or master, controller and each tensioner controller is also provided. The second angular position sensor coacting with its respective redirect roller provides fiber speed, allowing better control of the dancer position, estimation of current spool diameter to better track fiber usage, and to detect any malfunctions in fiber travel.

24 Claims, 5 Drawing Sheets

POSITION-CONTROLLED TENSIONER SYSTEM

BACKGROUND OF THE INVENTION

1. Field of the Invention

The present invention is generally related to the manufacture of composite structures. In particular, the present invention is related to computer-controlled fiber placement apparatus used to apply fiber tow to a laydown surface, usually about a rotating mandrel, to form a workpiece. More particularly, the present invention is especially suitable for, but not limited to, providing optimum fiber tow tension, controlling the velocity of the fiber tow, and precisely monitoring fiber travel as the fiber tow is despooled and ultimately applied to a laydown surface.

2. Background of Related Art

Fiber tow placement/winding machines typically place, or wind, a plurality of fibers, fiber tows, or filaments that have been impregnated with a thermosetting resin in a preselected pattern or weave, which is positioned upon a laydown surface mounted on a rotating mandrel. The laydown surface or workpiece may be cylindrical or, more likely than not, of an irregular shape. Regardless of the geometry the final workpiece is to have, it is generally imperative that the dimensions, contours, and overall structural quality of the workpiece meet or exceed very strict manufacturing and integrity requirements.

Most fiber tow placement/winding machines have a plurality of spools containing fibers or tows in which the fiber is de-spooled in order for it to be precisely positioned about the workpiece by a computer-controlled head located on a robotic arm. It is important that each fiber, of which there can be 32 or more individual spools of fiber, as it is being de-spooled and positioned simultaneously by the head, be wound about the workpiece at a preselected tension which is optimum for the particular fibers being used and the geometry of the particular laydown surface or workpiece being constructed. Such tensions can typically range from 0.25 pounds of force to approximately 1.0 pounds of force. Therefore, there is a long-standing need in the composite manufacturing industry to precisely control fiber tension as much as possible, or at least maintain the tension of the fiber within an acceptable range, as the fiber is being de-spooled from its individual spool and subsequently positioned about the workpiece.

Additionally, the tensioning system may be called upon to hold the fiber in a stand-by or stationary mode should that particular fiber not be needed on a given portion of the workpiece. Fiber tensioning systems are also called upon to take up any slack in the fiber slowly when tension is first applied to the fiber by the tensioning system so as not to unduly stress or break the fiber. Furthermore, fiber tensioning systems ideally detect malfunctions in the delivery of fiber, report them to a master computer or controller, and, if deemed appropriate, release the tension on the fiber. Preferably, fiber tensioning systems should be able to monitor fiber usage and detect a nearly empty spool condition and report such information to a master controller whereupon the operator can replace the nearly empty spool with a minimum of disruption. Therefore, it can be appreciated that there is a need within the industry for a fiber tensioning system that not only properly and precisely maintains the tension of a multitude of fibers within a narrow range of force in an economical manner but also reliably performs a variety of monitoring, reporting, and fault-detection tasks as well.

Fiber tensioning systems, including those used in computerized fiber placement/winding machines, often use a plurality of pulleys, or redirect rollers, mounted on a support structure which guides and supports the fiber as it is being de-spooled, or paid out, as it travels toward the computer-controlled head along a preselected path. Typically, the spool of fiber is mounted on a spool holder which is driven by a processor-controlled electric motor.

A fiber tension system incorporated within a fiber placement machine is disclosed within U.S. Pat. No. 5,223,072—Brockman et al., which is incorporated herein. The Brockman et al. '072 patent depicts a load cell being mounted to a redirect roller to sense the tension of the fiber, which in connection with a CNC controller system and a local microprocessor then controls the torque being imparted upon the spool by a drive motor. Furthermore, the CNC controller system and local processor uses position and velocity feedback information from the drive motor and incorporates a velocity loop as well as a force loop.

With respect to using pulleys, or redirect rollers, to manipulate fiber path in order to maintain a preselected tension, an article published in the August 1997 issue of PCIM magazine beginning on page 90, which is incorporated herein, describes a tension control system used in the manufacturing of nano-technology fiber sensors for the biotechnology industry. The described system includes the use of a dancer arm having a redirect roller at a free end of the arm and a low friction air cylinder attached at a midpoint along the arm. The computer-controlled, closed-loop feedback system allows fiber tension to be maintained by making automatic adjustments to an electric pressure regulator to increase or decrease the pressure being supplied to the cylinder in order to reposition the arm, thereby changing fiber tension during the manufacturing process thereof.

An objective of the present invention includes providing an accurate, reliable, and low-cost fiber tow tensioning system. Another objective is to reduce if not eliminate time-consuming calibration requirements and to provide a tensioning system suitable for use not only in any fiber placement machine but for use in any machine or process where tension and control of a fibrous element is required. It is a yet further objective to provide a fiber tension system that neither measures force, including electrically controlled force, nor requires analog sensors and associated circuitry which are subject to drift. Another objective of the present invention is to provide a fiber tension system which eliminates the need to control fiber spool holder torque, thereby allowing the use of inexpensive stepper motors to drive the fiber spool holder. Another objective is to provide a fiber tensioning system which detects a broken tow or other malfunction and reports such to a main controller and, if deemed appropriate, ceases tensioning. An additional objective is to provide a fiber tensioning system that takes up fiber slack slowly when tension is first applied, detects a nearly empty spool, determines fiber usage, as well as monitors fiber speed. These and other objectives and benefits of the present invention will become apparent upon reviewing the present specification in its entirety.

SUMMARY OF THE INVENTION

The present invention provides an apparatus and method for controlling tension of one or more fiber tows and preferably comprises a support frame having a spool holder, a motor for driving the spool holder, a dancer arm having a free end with a redirect roller mounted thereon and a fixed end pivotally mounted to coact with an angular-position sensor, a low-friction pneumatic cylinder mounted to the dancer arm and the support frame, a second redirect roller mounted to coact with a second angular-position sensor, a controller and associated circuitry to control the position-controlled tensioner system.

Preferably, a microcontroller mounted on a single printed circuit board (PCB) having signal buffering circuitry to control four individual tensioners is provided. The PCB preferably plugs into a STD-style backplane which allows communication between several microcontrollers, thereby allowing the control of at least 32 individual tensioners. Communication between a fiber placement machine main, or master, controller and each tensioner controller is also provided. Preferably, the motors driving the spool holders are stepper motors driven by respective stepper drivers. The microcontroller controls the stepper motor so as to feed or not feed fiber in order to maintain the dancer arm in a preselected position, usually its center position. The air cylinder mounted to each dancer arm is connected to a common pneumatic pressure regulator so that all tensioners in the same orientation receive the same pneumatic pressure. The tension on each fiber is thus controlled by monitoring its respective dancer arm's position, as being sensed by the angular-position sensor co-located with the dancer arm at its pivot point and accordingly activating the stepper motor to cause the fiber to allow the dancer arm to return to its neutral position. Additionally, forces due to gravity and the pneumatic cylinder acting upon the dancer arm and hence the fiber tow contribute to maintaining fiber tension as well. The second angular-position sensor coacting with its respective redirect roller provides fiber speed information, thereby allowing better control of the dancer arm position, and estimation of current spool diameter to better track fiber usage and to detect any irregularities or malfunctions of fiber travel.

Because each microcontroller preferably controls four tensioners, each micro controller is directly aware of both adjacent neighboring tensioners with respect to the other pair of tensioners within its direct control. Furthermore, the PCB's and the backplane are designed to allow the fiber speeds of the other tensioner's neighbors to be readily available to the main fiber placement machine controller should the detection of a broken tow fiber occur in any one of the tensioners. Additionally, the control logic detects if a fiber fails to de-spool and will automatically deactivate the respective stepper motor and monitor fiber travel thereafter. Thereafter, the control logic will then cause the stepper motor to slowly reinitiate tensioning if the detected problem appears to have cleared itself. An optional clutch, which is automatically engaged upon the stepper motor being activated and which automatically disengages when the stepper motor is deactivated, may be provided. Thus, the optional clutch provides a mechanism in which to selectively couple and decouple the spool holder from the stepper motor drive train and assists in further reducing fiber tension upon the controller sensing a de-spooling problem.

BRIEF DESCRIPTION OF THE SEVERAL VIEWS OF THE DRAWINGS

While the specification concludes with claims particularly pointing out and distinctly claiming the present invention, the present invention can be more readily understood by first viewing the drawings in conjunction with the following detailed description of the invention.

DETAILED DESCRIPTION OF THE INVENTION

Figure 1:
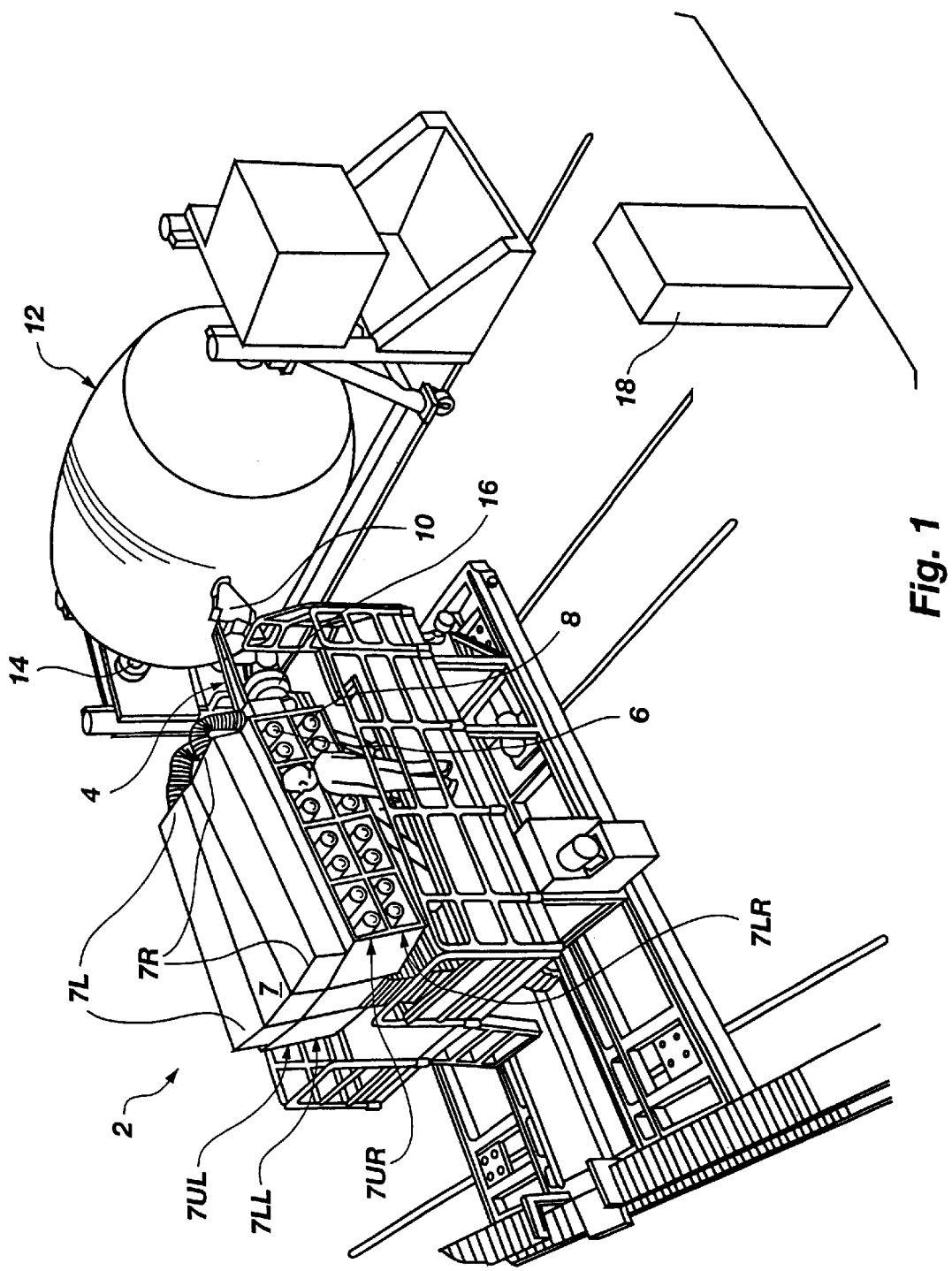
FIG. 1 is an illustration of a typical fiber placement machine in which the present invention is particularly suitable for use.

Referring now to FIG. 1 of the drawings shown is an illustration of a typical robotic fiber placement/winding machine, or system, 2 having a plurality of fiber tows 4, which can range up to at least 32 individual tows being simultaneously de-spooled from upper-positioned fiber spools 6 and lower-positioned fiber spools 8. Fiber placement/winding machine 2 is provided with a creel 7 which has a left side 7L and a right side 7R. Each side of creel 7 respectively supports and drives an upper row of fiber spools and a lower row of fiber spools. Particularly, although not viewable in FIG. 1, the row of fiber spools located on the upper left side of creel 7 is designated as 7UL, the row of fiber spools located on the lower left side of creel 7 is designated as 7LL and is arranged to be a mirror image of the row of fiber spools located on the upper right side of creel 7, designated as 7UR, and the row of fiber spools located on the lower right side of creel 7, designated as 7LR in FIG. 1. The individual fiber tows 4, which are unwound from the respective spools positioned in the various rows of creel 7 and are usually preimpregnated with a thermosetting resinous material, are individually guided through a computer-controlled fiber tow placement head 10 which ultimately places preselected individual fibers on the surface of a workpiece 12. Typically, workpiece 12 is of an irregular shape and is mounted on a powered rotatable mandrel 14 which serves to facilitate the wrapping, or laying down, of fiber to build up the ultimate configuration of workpiece 12. Generally, placement head 10 is mounted on a robotic arm 16 controlled by a main controller 18 which not only manipulates robotic arm 16 but also controls the payout of each of the thirty two or more fiber tows 4 as well as the rotational speed of mandrel 14 so that the respective individual fiber 4 tows are placed on workpiece 12 and tensioned in as concerted a fashion as possible.

Figure 2:
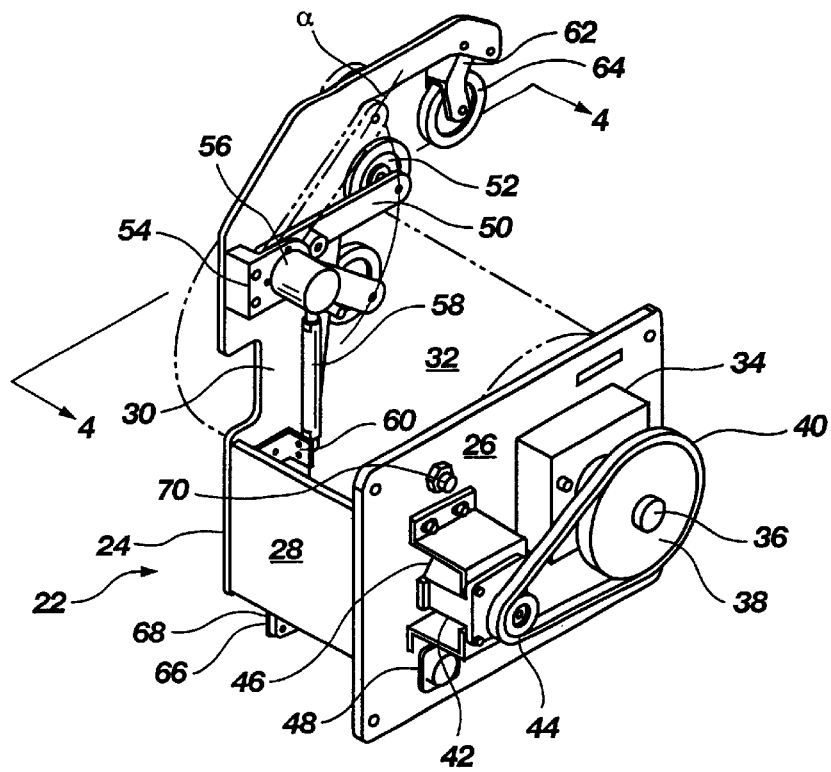
FIG. 2 is an isometric view of the preferred embodiment of the position-controlled tensioner assembly for use in connection with a fiber spool located on the upper left side of the creel and which if horizontally rotated and upon substituting a minor component, would be for use in connection with a fiber spool located on the lower right side of the creel.

Referring now to FIG. 2 of the drawings, position tensioner assembly 22 of the present invention is specifically designed to be used in connection with upper-positioned fiber spools such as the nonviewable fiber spools positioned in row 7UL as depicted in FIG. 1 which would be located on the back side, or the left side 7L and are a mirror image to lower fiber spools 8, installed and viewable on right side 7R of creel 7 of FIG. 1. Returning to FIG. 2, position tensioner assembly 22 includes a support module 24 having a face plate 26, a web plate 28, and a redirect/dancer support plate 30. Support module 24 is preferably fabricated of aluminum alloy, but any material having suitable structural strength may be used. A spool of fiber tow 32 is mounted on a spool shaft 36 which passes through face plate 26 and which is, in turn, supported by a bearing block 34 mounted on face plate 26. In order to drive spool shaft 36, spool shaft 36 has a spool pulley 38 mounted thereon for accommodating a drive belt 40 attached to a motor pulley 44 which is connected to a stepper motor 42. Stepper motor 42 is commercially available from Pacific Scientific, with model M21NRXB-LNN-NS-00 being particularly suitable. However, stepper motors from any manufacturer having the desired ratings and physical characteristics would work well with the present invention. An adjustable stepper motor mount 46 provides a simple and convenient method of adjusting the tension of drive belt 40. Although a drive belt arrangement is preferred for its simplicity, ease of selecting a drive reduction ratio, and ease of maintenance, alternative drive mechanisms such as gear reduction drives could be used as well. Electrical connector 48 is for connecting power leads and signal leads to encoders 56 and 66, which will be described below. Stepper motor 42 is preferably electrically activated by an individual stepper motor driver (not shown in the drawings) as such drivers are well known and used within the art.

One end of fiber tension dancer arm 50, referable to as a fixed end, is pivotally connected to redirect/dancer support plate 30 and face plate 26 while the other end of the arm, the free end, has a fiber tow redirect roller mounted thereon. The pivotally connected end of dancer arm 50 is mounted in combination with a rotary optical encoder 56 by way of dancer arm encoder bracket 54. Thus, any movement of the dancer arm within its range of motion is detected via rotary optical encoder 56. A particularly suitable optical encoder having model no. RS16D-P1-1024-1/4-5-CA18-LD-0-M1-S is commercially available from Renco Encoders, Inc. However, alternative encoders may be commercially obtained from other sources. An extremely low-friction pneumatic cylinder 58 is attached at a preselected point along the span of dancer arm 50 which will allow adequate stroke action of cylinder 58 with respect to the desired range of motion of dancer arm 50. An exemplary pneumatic cylinder particularly suitable for the present position tensioner assembly is referred to as an Airpel cylinder available from Airpot Corporation. The airpel cylinder, model E9D2.OU has proved to be particularly suitable. Pneumatic cylinder 58 is anchored to redirect/dancer support plate 30 by mounting bracket 60.

Figure 4:
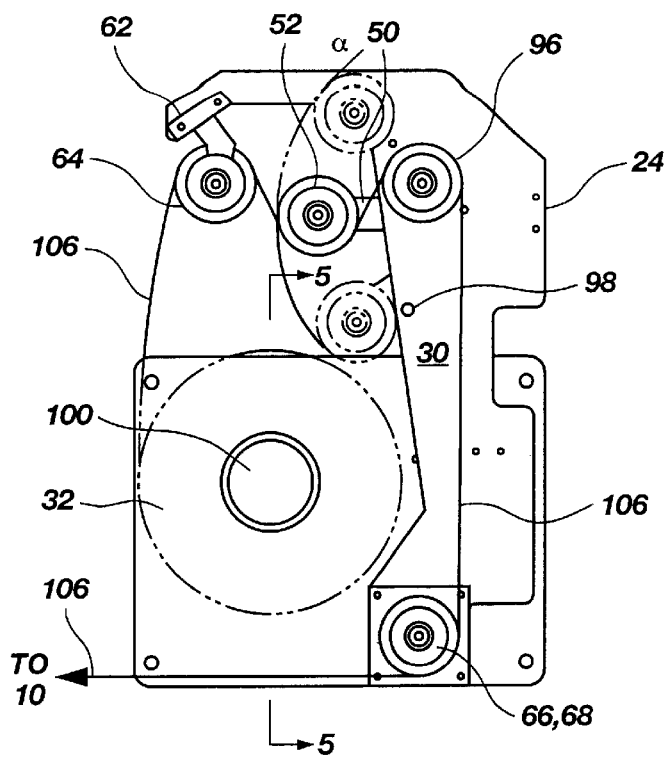
FIG. 4 is a cross-sectional view of the position-controlled tensioner assembly taken along line 4—4 of FIG. 2.

A swiveling bracket 62 having a redirect roller 64 mounted thereon is attached to the distant end of redirect/dancer support plate 30 so as to allow fiber tow to be unwound from spool 32, to be guided through position tensioner assembly 22 via fiber tow redirect rollers 64 and 52, and to be paid out by payout redirect roller 68 mounted at the lowermost point and on the back side of plate 30 as viewed in FIG. 2, or as can be better viewed in FIG. 4, wherein a view of the opposite side of tensioner assembly 22 is provided and routing of fiber 106 is depicted. Returning to FIG. 2 and by way of example, a dancer arm having an overall length of approximately 6 inches and having a center-to-center distance of 5.25 inches between the mounting point of the pivotally fixed end of the dancer arm and the redirect roller attachment point on the opposite free end and having cylinder 58 pivotally mounted 1.5 inches from the center of the pivotally fixed end of the dancer arm proved to offer the proper geometry. Additionally, the example dancer arm had a range of motion extending approximately 45° of arc above and below the horizontal, thereby totaling approximately 90° from the topmost position to the bottom-most position of the dancer arm's range of allowed motion depicted as a in FIGS. 2 and 4. This range of motion can, of course, be modified, as well as the length of the dancer arm, the mounting point of cylinder 58, and the diameter of redirect pulleys, or functionally equivalent fiber guides, in order to meet the demands of particular applications in which the present invention is suited.

Payout redirect roller 68 is mounted in connection with an additional rotary optical encoder 66, available from Renco Encoders, Inc. with model no. RS16D-P1-1024-1/4-5-CA18-LD-0-M1-S also being preferred as with encoder 56, for detecting the rotational speed of redirect roller 68 as fiber is paid out to fiber tow placement head 10 of fiber placement machine 2. Alternatively, other optical encoders can be commercially obtained from other sources and used in lieu of the preferred Renco encoder. Bulkhead union 70 facilitates attachment of a pressurized air supply line to pneumatic cylinder 58.

Although position tensioner 22 as shown in FIG. 2 is particularly suited for holding and tensioning fiber spools mounted in row 7UL located on the upper left side of creel 7, the same positioner can be used for holding and tensioning fiber spools mounted in row 7LR on the lower right side of creel 7 by horizontally rotating position tensioner assembly 22 180 degrees so that spool shaft 36 holding a spool of fiber tow 32 extends outwardly away from creel 7 and redirect dancer support plate 30 extends downwardly when positioned in row 7LR. Furthermore, it will be necessary to substitute swiveling bracket 62, in which a redirect roller 64 is mounted, with weighted swiveling bracket 82 having a counter balance 84, further described below, which serves to keep bracket 82 and redirect roller 64 properly oriented upwardly to accommodate fiber being unwound from spool 32 when position tensioner 22 is placed in an inverted orientation.

Figure 3:
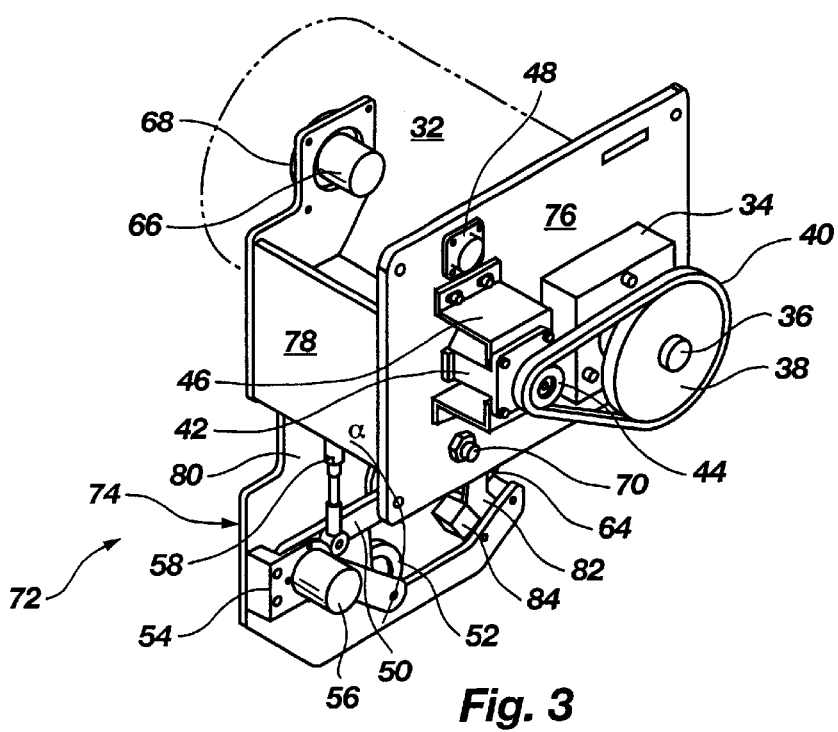
FIG. 3 is an isometric view of the preferred embodiment of the position-controlled tensioner assembly inverted for use in connection with a fiber spool located on the lower left side of the creel and which, if horizontally rotated and upon substituting a minor component, would be suitable for use with a fiber spool located on the upper right side of the creel.

Referring now to FIG. 3 of the drawings, an inverted position tensioner assembly 72 is shown. Inverted position tensioner assembly 72 (also referred to as "tensioner 72") differs from assembly 22 shown in FIG. 2 in that support module 74 has been reoriented to be installed in fiber placement machine 2 to accommodate, guide, and tension fiber tow spools located in lower left row 7LL located on the nonviewable back or left side 7L of creel 7 as shown in FIG. 1 which are a mirror image to lower fiber spools 8 shown in the lower position within right side 7R of creel 7. Returning to FIG. 3, face plate 76 is essentially the same as face plate 26 other than it being horizontally rotated 180 degrees and having essentially similar, if not identical, components correspondingly attached, or otherwise provided, to position spool holder bearing block 34 relatively lower in position. That is, face plate 26, prior to having the other components installed thereon, is horizontally rotated to become, in essence, face plate 76 and then the other components are added thereto so as to provide a properly assembled tensioner 72. Like face plate 76, redirect/dancer plate 80 is horizontally rotated 180 degrees prior to being attached to face plate 76 by way of a web 78 in order to reorient payout redirect roller 68 and encoder 66 above fiber spool 32, redirect/dancer plate 80, and redirect roller swivel bracket 82 in a lower or inverted position as shown. To offset the effects of gravity, a counter balance 84 is mounted at a low spot on swivel bracket 80 to keep bracket 82 properly upright when tensioner 72 is installed in row 7LL of creel 7 of fiber placement/winding machine 2 depicted in FIG. 1.

As with assembled tensioner 22 shown in FIG. 2, assembled inverted tensioner 72 shown in FIG. 3, upon the assembly being horizontally rotated 180 degrees, and weighted swivel bracket 82 having redirect roller 64 and also having counter balance 84 mounted thereon is replaced with a nonweighted swivel bracket 62 having a redirect roller 64 mounted thereon, and can be used for supporting and tensioning fiber spools positioned in row 7UR located on right side 7R of creel 7 as shown in FIG. 1. To summarize: tensioner 22 as shown in FIG. 2 is ready for installation in the upper left row 7UL of left side 7L of creel 7 as designated in FIG. 1; upon horizontally rotating an assembled tensioner 22 and replacing swivel bracket 62 with a weighted swivel bracket 82, such rotated tensioner 22 provided with a weighted swivel bracket 82 is ready for installation in the lower right row 7LR of right side 7R of creel 7 as shown in FIG. 1; tensioner 72 as shown in FIG. 3 is ready for installation in the lower left row 7LL of left side 7L of creel 7 as designated in FIG. 1; and upon horizontally rotating an assembled tensioner 72 and replacing weighted swivel bracket 82 with a non-weighted swivel bracket 62, such rotated tensioner 72 is ready for installation in the upper right row 7UR of right side 7R of creel 7 as shown in FIG. 1. Thus, tensioners 22 and 72 as shown in FIGS. 2 and 3 are ready to respectively serve in two of the total of 4 differently oriented tensioner assemblies required to provide creel 7 with a total of four rows of properly supported and oriented spools of fiber. Upon rotating completed tensioner assemblies 22 and 72, and making appropriate swivel substitutions, rotated tensioner assemblies 22 and 72 are adapted to respectively serve in the remaining two of the total of 4 differently oriented tensioner assemblies required to provide creel 7 with the total of four rows of properly supported and oriented spools of fiber. This four-row arrangement allows for the easy replacement of spools of fiber by the operator of fiber placement/winding machine 2 as the spools in each of the four rows, 7UL, 7LL, 7UR, and 7LR are, depleted when the fiber from each spool is being laid down on workpiece 12.

Turning now to FIG. 4, shown is a cross-sectional view taken along line 4—4 as depicted in FIG. 2. FIG. 4 shows the back side of support module 24 including redirect/dancer support plate 30 and the path of an individual fiber tow 106 as the fiber tow would be unwound and guided through tensioner assembly 22 by redirect roller 64, redirect dancer arm roller 52, back side redirect roller 96, and, lastly, payout redirect roller 68 before traveling on to fiber placement head 10. The range of motion of dancer arm 50, having redirect roller pulley 52 mounted thereon, depicted as a in FIG. 2, and, as can be seen the uppermost range is limited by the shape of plate 30 and the bottom-most range is limited by a dowel pin 98 as the dancer arm rotates about its attachment point, not viewable in FIG. 4. A spool holder 100 is configured and sized to readily receive and securely hold a spool of fiber tow 32 as fiber tow is being paid out. Such spool holders may be fabricated or readily obtained from commercial sources.

Figure 5:
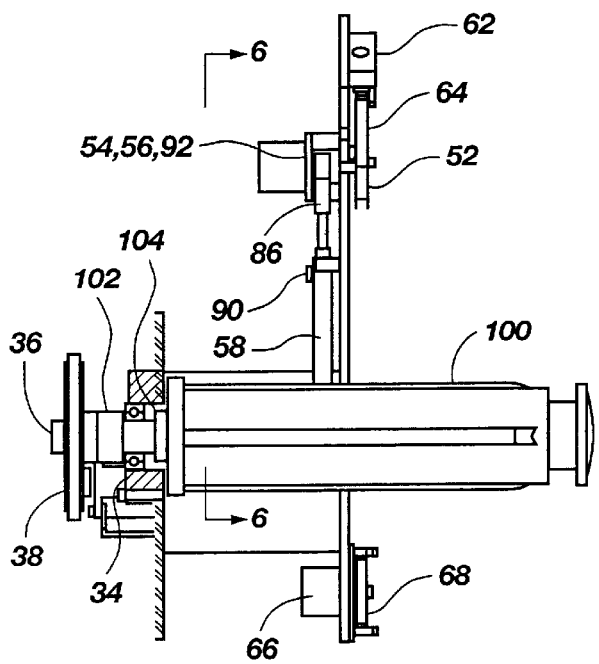
FIG. 5 is a cross-sectional view of the position-controlled tensioner assembly taken along line 5—5 of FIG. 4.

Turning now to FIG. 5, shown is a cross-sectional view taken along line 5—5 as depicted in FIG. 4. FIG. 5 provides a view of spool holder 100 as mounted on spool shaft 36. Additionally, spacer 102 is used to space pulley 38 at an appropriate distance from bearing block 34 in order to be aligned with the motor pulley. Spacer 104 is used to properly position spool shaft 36 with respect to bearing block 34. The positioning of dancer arm rotary optical encoder 56 associated with redirect roller 52 and rotary optical encoder 66 with attached payout redirect roller 68 can readily be seen in this view.

Figure 6:
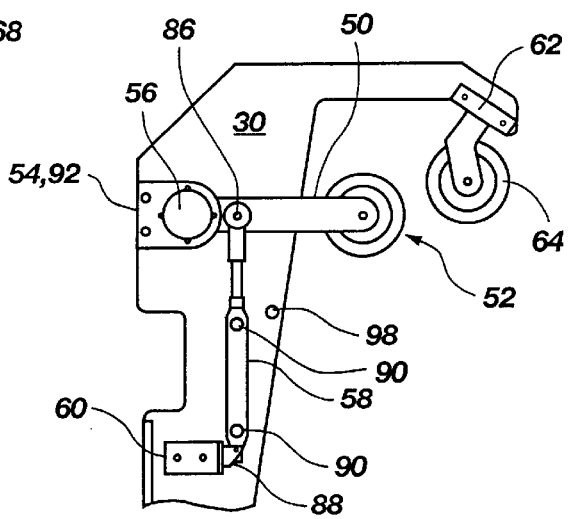
FIG. 6 is a front view of the dancer arm and the pneumatic cylinder portion of the position-controlled tensioner assembly, which corresponds to the view taken along line 6—6 of FIG. 5.

Referring now to FIG. 6, shown is a view of the upper portion of plate 30 showing dancer arm 50 and preferred Airpel pneumatic cylinder 58 as taken along line 6—6 of FIG. 5. Preferably the rod end of pneumatic cylinder 58 is attached to dancer arm 50 by a rod-end bearing 86 and an appropriate fastener. A clevis 88 secures the opposite end of pneumatic cylinder 58 to cylinder mounting bracket 60 by an appropriate fastener. A pair of adjustable metering valves 90 is provided on cylinder 58 for controlling the flow rate of air entering and departing the cylinder in order to fine tune the motion of dancer arm 50 and to provide the cylinder with a pneumatic preload upon position tensioner assembly 22 being put into service. Preferably, an adjustable encoder clamp 92 is installed in connection with dancer arm encoder bracket 54 for convenient adjustment thereof.

Referring generally to FIGS. 1–6 when appropriate, with respect to controlling stepper motor 42, a stepper motor driver is preferably connected to a microcontroller mounted on a single printed circuit board (PCB) with signal buffering circuitry to control preferably four neighboring position tensioner assemblies 22 and 72, that is, four such assemblies located on the same side of fiber placement machine 2 and that are directly adjacent to each other. The respective PCBs are plugged into an STD-style single backplane, which allows communication between all of the microcontrollers needed to control all position tensioner assemblies. Preferably, an RS485 serial bus is provided which allows communication between the main fiber placement machine controller 18 and each tensioner controller (not shown in drawings). The microcontrollers control respective stepper motors 42 by way of a stepper motor driver so as to reactively return dancer arm 50 to its center, or horizontal, position. All like-oriented pneumatic cylinders 58, that is, all those that are upright as contrasted with those that are inverted, receive the same air pressure via a common pressure regulator for each orientation. In other words, there is a first common pressure regulator for the tensioner assemblies mounted in an upright position, i.e., those installed in rows 7UL and 7UR, and a second common pressure regulator for the tensioner assemblies mounted in an inverted position, i.e., those installed in rows 7LL and 7LR, in order to accommodate slightly differing operating pressures of the respectively oriented assemblies. Typical pneumatic operating pressures are in the magnitude of approximately 15 psig (approximately 103.4 KPa) with an additional 5–10 psig (34.5–68.9 KPa) being supplied to the inverted assemblies. The various redirect rollers are positioned and the dancer arm is geometrically designed so that minor variations in the dancer arm position result in negligible changes in fiber tension. That is, the fiber tension is influenced by the weight of the dancer arm, including the redirect roller attached to the free end thereof, hence different common pressure regulators and respective settings for the upright and inverted tensioner assemblies, as well as by forces attributable to the pneumatic cylinder reacting to the supplied air pressure. Tension is generally governed with the microcontroller monitoring the position of the dancer arm via input from the dancer arm encoder and fiber speed via the payout redirect encoder to cause the stepper motor driver to cause the stepper motor to increase or decrease rpm as appropriate to return the dancer arm to its center or horizontal position. Generally speaking, as dancer arm redirect roller 52 swings upward beyond the neutral center position away from fiber spool 32, for the upright orientation depicted in FIG. 4, the fiber tow will be experiencing an increase in tension from the norm and upon roller 52 swinging below the neutral center position toward fiber spool 32, fiber tow 106 will be experiencing a decrease in tension from the norm. The same holds true for the inverted orientation of the fiber position tensioner assembly with respect to the relative motion of roller 52 with respect to spool 32, but references to "upward" and "downward" would be reversed.

Furthermore, due to rotary optical encoder 66 providing information to the microprocessor as to payout redirect roller rpm, fiber tow speed can be determined by known algorithms, and tracking of the total amount of fiber unwound from a given spool and the amount of fiber remaining on the spool can be determined by known algorithms and pre-entered data. Thus, the present invention allows the tension of the fiber to be controlled without the need for controlling the torque of the fiber spool motor driving the spool holder and thereby eliminates the need for analog sensors and associated circuitry which are prone to drifting and calibration difficulties. Furthermore, the fiber payout encoder of the present invention eliminates the need for the fiber placement machine main controller to provide fiber velocity information to the microcontroller, thereby allowing more precise and quicker error detection. Moreover, the fiber tensioner including a fiber payout encoder in accordance with the present invention can be used on fiber placement/winding machines otherwise not equipped to supply fiber speed information.

Because preferably one microcontroller is used for four position tensioner assemblies that physically neighbor each other, the microcontroller is directly aware of the fiber speed of the other adjacent assemblies for any one positioner assembly within its control group by virtue of the microcontroller being mounted on a single PCB having signal buffering circuitry to control each of the four assemblies in the group. In addition, the PCB of each microcontroller of other groups of tensioner assemblies is in communication with the backplane so that information is available from other microcontrollers to detect if a fiber tow of a given group has broken or if a fiber tow was not added after being commanded to do so. In such cases, a signal can be sent to the main controller of the fiber placement machine allowing it to stop momentarily for an operator to determine and remedy the problem.

Figure 8:
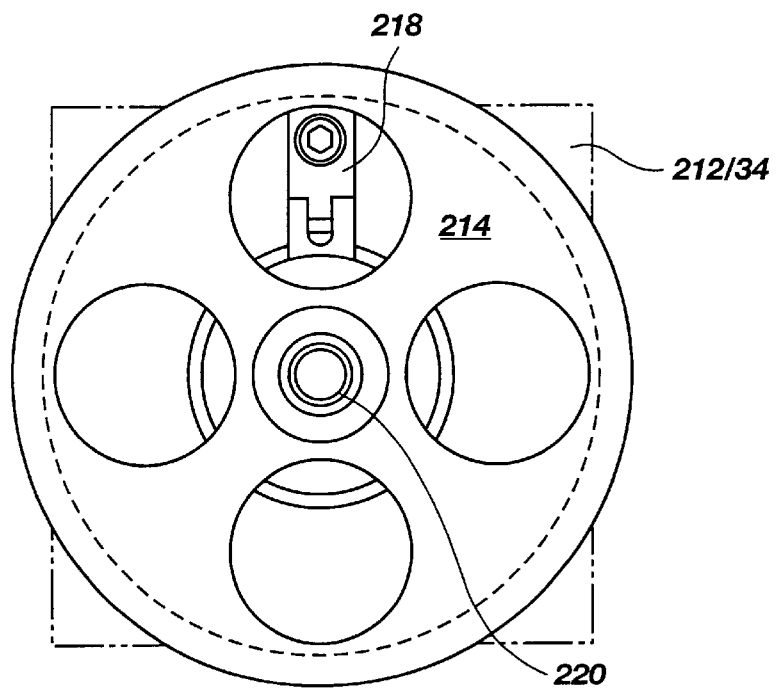
FIG. 8 is a front view of the optional clutch assembly shown in FIG. 7.
Figure 9:
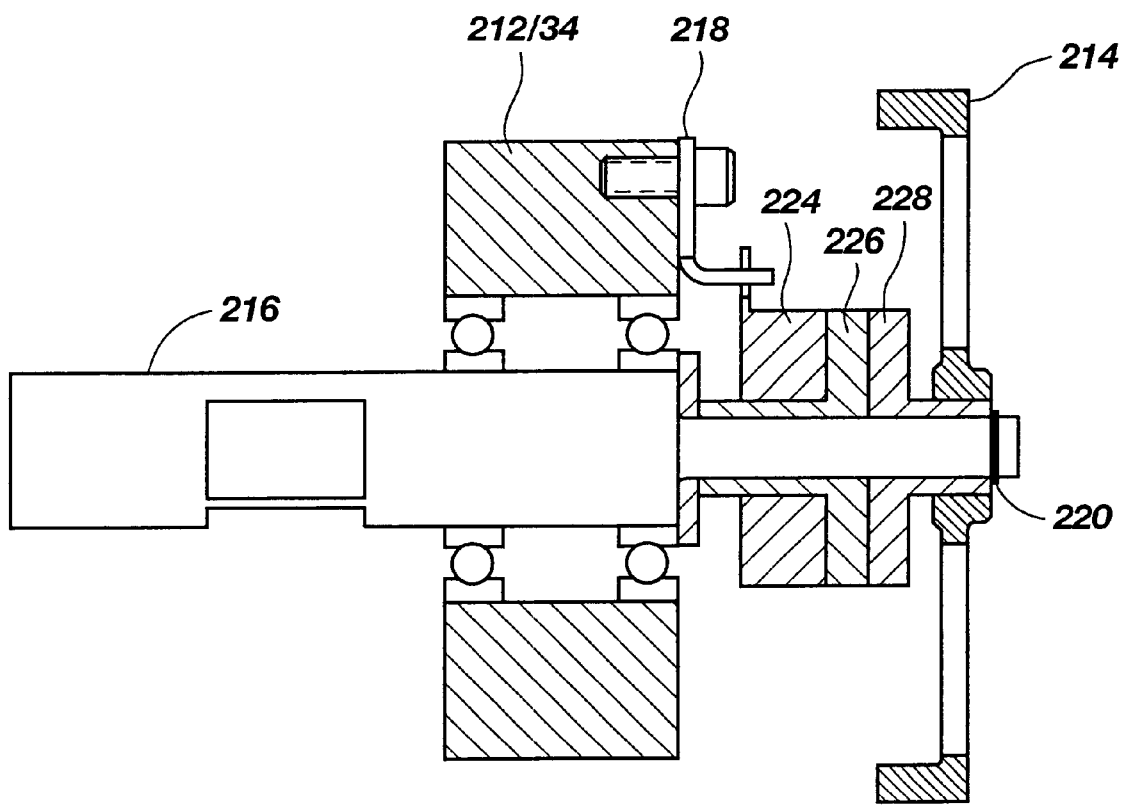
FIG. 9 is a cross-sectional view of the optional clutch assembly taken along line 9—9 of FIG. 7.

The tensioner controller of the present invention may optionally be provided with programmed logic able to detect if a given fiber tow fails to de-spool, which can be an occasional problem with spooled fiber being overly tacky from time to time. If a fiber tow fails to despool, the programmed logic can momentarily turn off the respective stepper motor and the fiber travel can be monitored. If the fiber appears to be traveling adequately, the microcontroller will reinitiate tensioning gradually so as not to break the fiber tow and further monitor the fiber tow for problems. In order to facilitate the correction of such a de-spooling problem, an optional clutch can be provided to reduce the amount of tension required to overcome the inherent back resistance, or drag, of the stepper motor and reduction drive. Thus, the optional clutch increases the likelihood of being able to successfully de-spool the troublesome fiber tow automatically prior to sending a signal to the main controller to momentarily shut down the fiber placement machine to allow an operator to troubleshoot the problem. An exemplary optional clutch for achieving the proceeding is shown in FIGS. 7–9.

Figure 7:
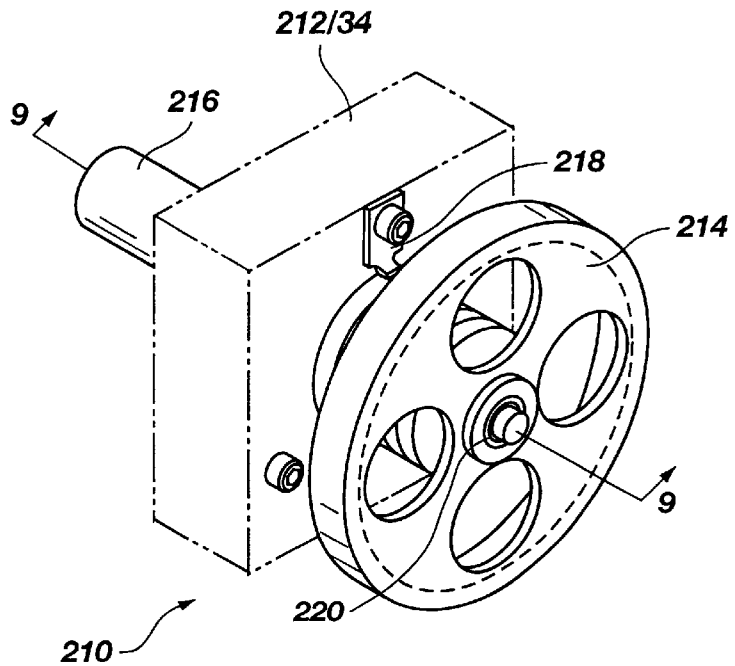
FIG. 7 is an isometric view of the optional clutch assembly of the present invention.

An isometric view of optional clutch assembly 210 is shown in FIG. 7. Clutch assembly 210 is mounted on spool holder shaft 216 which is secured with bearing block 212, previously referred to as numeral 34 in the drawings. Pulley 214 is secured to shaft 216 with a retaining ring 220 and the clutch housing 224 is prevented from rotating by retainer clip 218 and can be better seen in FIG. 8 and the cross-sectional view of the clutch assembly shown in FIG. 9.

In operation, a solenoid within the clutch draws friction element 226 into contact with shaft mount 228 to effectively couple pulley 214 to shaft 216. A particularly suitable housing and solenoid portion of the clutch is commercially available from PIC Design, having part no. RW4-355. Thereafter, the operation is the same as described above in that pulley 214 is connected to motor pulley 46 by drive belt 40 and shaft 216 rotates upon stepper motor 42 being activated by its respective driver according to instructions received by the associated microcontroller. Upon the microcontroller detecting a fiber feed problem as discussed above, the clutch solenoid is deactivated and friction element 226 is no longer effectively engaged to web plate 28, allowing spool holder shaft 216 to spin more freely and thereby reduce the current tension on the problem fiber tow to allow the problem fiber tow to correct itself. Upon the passage of a preselected amount of time, the microcontroller can gradually increase tension on the problem fiber tow via appropriate commands to the stepper motor driver and upon reenergizing the solenoid to re-engage the clutch if the problem fiber tow appears to have corrected itself. If the problem fiber tow does not appear to the microprocessor to have corrected itself, the microprocessor can send appropriate signals to the master controller for displaying a warning and/or shutting down the fiber placement machine for operator investigation.

It is to be understood and appreciated that the present invention as defined by the following claims is not to be limited by the particular details set forth in the above-detailed description as many variations thereof are possible without departing from the spirit and scope of the claims.

What is claimed is:

1. An apparatus for controlling tension of a fiber comprising:
    a spool holder for rotatably holding a spool of fiber;
    a stepper motor for driving the spool holder;
    redirect guides for redirecting and guiding the fiber within the apparatus;
    a dancer arm having a fixed end cooperatively attached to a first angular sensor for sensing a relative angular position of the dancer arm; and
    a free end having a fiber redirect guide mounted on the dancer arm for guiding the fiber and redirecting a path of the fiber;
    a low-friction preloadable pneumatic cylinder being connectable to a pressurized pneumatic supply, the pneumatic cylinder having a first end pivotably mounted at a preselected point along the dancer arm and a second end pivotably mounted to a support structure;
    a second angular sensor for sensing a relative speed of the fiber; and
    a process controller having circuitry to control fiber tension by adjusting stepper motor speed responsive to dancer arm position information provided by said first angular sensor.

2. The apparatus of claim 1, wherein the process controller is a microcontroller mounted on a single printed circuit board having signal buffering circuitry, and in which the single printed circuit board is connected to a single backplane allowing communication between at least one additional process controller mounted on another printed circuit board.

3. The apparatus of claim 1, wherein at least one of the fiber redirect guides is a roller.

4. The apparatus of claim 1, wherein at least one of the redirect guides for redirecting and guiding the fiber within the apparatus is a swivelably mounted fiber redirect roller.

5. The apparatus of claim 1, wherein the process controller is in electrical communication with a remote master process controller.

6. The apparatus of claim 1, wherein at least one of the first and second angular sensors is a rotary optical encoder.

7. The apparatus of claim 6, wherein the second sensor monitors at least one of the redirect guides for redirecting and guiding the fiber within the apparatus and provides fiber velocity information to the process controller and further wherein each of the first and second angular sensors are rotary optical encoders.

8. The apparatus of claim 1, wherein a clutch is provided to automatically disengage the spool fiber holder from the power source upon the processor controller detecting a fiber feed problem.

9. The apparatus of claim 8, wherein the clutch further comprises an electric solenoid mechanism selectively energizable by the processor controller, the solenoid mechanism being positioned proximate to the spool holder, and a pulley driven by the power source.

10. The apparatus of claim 1, wherein preload of the low-friction pneumatic cylinder is a pneumatic pressure regulator and further wherein the low-friction pneumatic cylinder is provided with at least one metering valve.

11. A process control system for controlling tension of a plurality of fibers in a fiber placement apparatus having a master process controller and the system comprising a plurality of fiber tensioner assemblies, each further comprising:

a spool holder for rotatably holding a spool of fiber;
a power source for driving the spool holder;
at least one guide for redirecting and guiding the fiber within each fiber tension assembly;
a dancer arm having a fixed end cooperatively attached to a first sensor for sensing a relative angular position of the dancer arm; and a free end having a fiber redirect guide mounted at a preselected position;
a low-friction, preloadable pneumatic cylinder being connectable to a pneumatic supply, the pneumatic cylinder having a first end pivotably mounted at a preselected point along the dancer arm and a second end pivotably mounted to a support structure;
a second angular sensor for sensing a relative speed of the fiber; and
at least one process controller in proximity to at least one of the plurality of fiber tensioning assemblies having circuitry to control fiber tension by controlling the power source as a result of dancer arm position information provided by at least the first sensor;
wherein at least one printed circuit board of the fiber tensioner assemblies is provided with signal buffering circuitry for at least one preselected process controller to control a preselected number of neighboring tensioner assemblies, at least one preselected process controller further being connected to a single backplane which allows communication between a plurality of preselected process controllers, and at least one preselected process controller being in electrical communication with 12. The system of claim 11, wherein the first and second sensors of at least one of the plurality of tensioner assemblies are rotary optical encoders and wherein the second optical encoder provides fiber velocity information to at least one process controller in proximity to at least one of the fiber tensioner assemblies.

13. The system of claim 11, wherein the power source an electric stepper motor in communication with a stepper driver.

14. The system of claim 11, wherein preload of the pneumatic cylinder of at least one of the fiber tensioner assemblies is adjustable by at least one metering valve, and a pressure regulator is provided to maintain the pneumatic supply at a preselected pressure.

15. The system of claim 11, wherein at least one of the guides for redirecting and guiding the fiber within at least one of the fiber tensioner assemblies is a roller, and wherein at least one of the guides for redirecting and guiding the fiber within the at least one of the fiber tensioner assemblies is a swivelably mounted roller.

16. The system of claim 11, wherein at least one of the plurality of fiber tensioner assemblies is provided with a clutch which automatically disengages the spool holder from the power source upon the at least one processor controller detecting a fiber feed problem.

17. The system of claim 16, wherein the clutch further comprises an electric solenoid mechanism selectively energizable by the at least one processor controller, the solenoid mechanism being positioned proximate to the spool holder, and a pulley driven by the power source.

18. A method of controlling the tension of a plurality of spooled fibers in a fiber placement apparatus having a master process controller and a plurality of fiber tensioner assemblies, comprising:

rotating a spool of fiber of at least one fiber tensioner assembly of the plurality with a stepper motor to dispense fiber;
guiding the fiber over a redirect guide mounted to a free end of pivotally mounted dancer arm;
imparting a predetermined bias on the dancer arm with a pneumatic cylinder pivotally attached thereto, so as to create a desired tension in the fiber;
sensing and relaying a relative angular position of the dancer arm to a tensioner assembly process controller; and
varying speed of the stepper motor with the tensioner assembly process controller in response to the relative angular position of the dancer arm, so as to maintain a substantially constant tension in the fiber.

19. The method of claim 18, further comprising controlling from 1 to 4 fiber tensioner assemblies of the plurality with a single tensioner assembly process controller.

20. The method of claim 18, further comprising providing a plurality of tensioner assembly process controllers, each controlling at least one fiber tensioner assembly of the plurality, and monitoring the plurality of tensioner assembly process controllers with the master process controller by communicating through a common backplane.

21. The method of claim 18, further comprising sensing and relaying fiber speed information to the tensioner assembly process controller.

22. The method of claim 21, further comprising preprogramming the tensioner assembly process controller to momentarily deactivate the stepper motor in response to receiving information that the fiber speed thereof is essentially stationary and, upon a preselected parameter being met, re-activating the stepper motor to gradually reinitiate fiber tension.

23. The method of claim 22, further comprising coupling or decoupling the stepper motor from the spool of fiber with a clutch controlled by the tensioner assembly process controller.

24. The method of claim 23, further comprising activating the clutch using an electric solenoid mechanism selectively energizable by the tensioner assembly processor controller.

* * * * *

UNITED STATES PATENT AND TRADEMARK OFFICE
CERTIFICATE OF CORRECTION

PATENT NO. : 6,491,773 B1
DATED : December 10, 2002
INVENTOR(S) : Lloyd G. Miller and Keith G. Shupe It is certified that error appears in the above-identified patent and that said Letters Patent is hereby corrected as shown below:

Column 1,
Line 49, change "stand- by" to -- stand-by --

Column 2,
Line 8, change "processor- controlled" to -- processor-controlled --

Column 5,
Line 53, change "airpel" to -- Airpel --

Column 6,
Line 1, change "6" to -- 6 -- (no boldface)
Lines 12 and 56, change "a" to -- α --

Column 12,
Line 5, insert -- the master process controller of the fiber placement apparatus. -- after "with"
Line 13, insert -- is -- between "source" and "an"

Column 13,
Line 1, insert space between "18," and "further"

Signed and Sealed this

Fourth Day of January, 2005

JON W. DUDAS
*Director of the United States Patent and Trademark Office*